United States Patent [19]

Allen et al.

[11] Patent Number: 5,539,806
[45] Date of Patent: Jul. 23, 1996

[54] METHOD FOR CUSTOMER SELECTION OF TELEPHONE SOUND ENHANCEMENT

[75] Inventors: Jonathan B. Allen, Mountainside, N.J.; John C. Songrady, Washington Crossing, Pa.

[73] Assignee: AT&T Corp., Murray Hill, N.J.

[21] Appl. No.: 311,647

[22] Filed: Sep. 23, 1994

[51] Int. Cl.⁶ ..................................................... H04M 3/00
[52] U.S. Cl. .......................... 379/52; 379/343; 379/347; 379/406; 381/68.2; 381/68.4
[58] Field of Search ................................ 379/52, 67, 343, 379/347, 406; 381/68.2, 68.4, 94, 101, 102, 103

[56] References Cited

U.S. PATENT DOCUMENTS

| | | | |
|---|---|---|---|
| 4,926,459 | 5/1990 | Advani et al. | 379/375 |
| 5,280,525 | 1/1994 | Wesel | 379/406 |
| 5,329,581 | 7/1994 | Friedes et al. | 379/92 |
| 5,388,185 | 2/1995 | Terry et al. | 395/2.14 |

*Primary Examiner*—Jeffery Hofsass
*Assistant Examiner*—Daniel S. Hunter
*Attorney, Agent, or Firm*—Gerard A. deBlasi; Thomas A. Restaino

[57] ABSTRACT

Methods and apparatus are disclosed for improving the clarity and intelligibility of incoming speech in a telephone connection. Improved sound quality is provided by automatically selecting, or enabling the selection of, an appropriate sound enhancement for a particular individual at a given telephone number. Sound enhancements applied to calls originating from or terminating at a given telephone station are determined on a call-by-call basis. The sound enhancement set at the beginning of a telephone call can be changed mid-call to a different sound enhancement. Thus, different occupants of a household may select their own sound enhancement, or may select no enhancement at all.

17 Claims, 1 Drawing Sheet

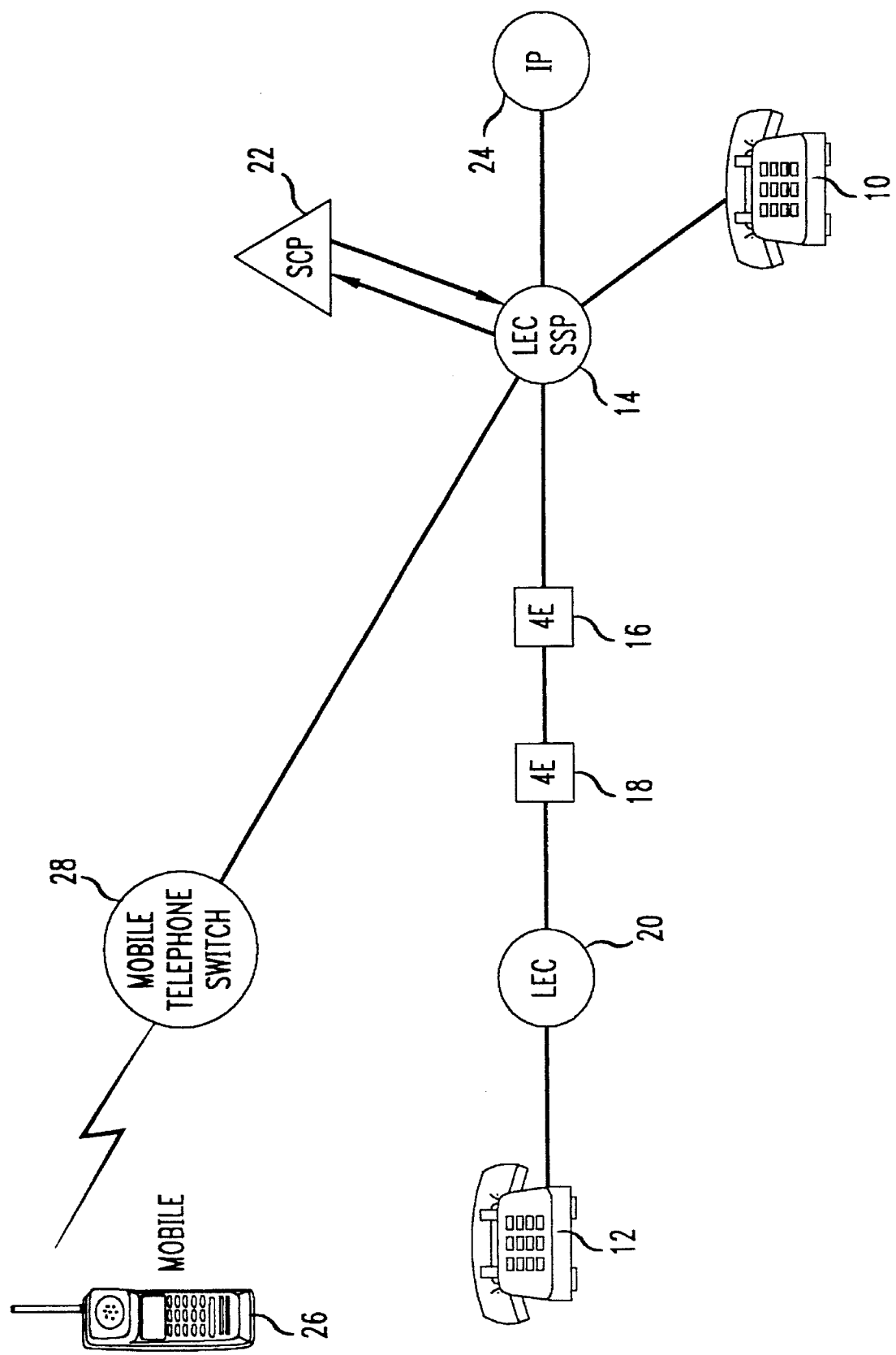

METHOD FOR CUSTOMER SELECTION OF TELEPHONE SOUND ENHANCEMENT

TECHNICAL FIELD

This invention relates to telecommunications services and, more particularly, to improved methods for processing calls to enhance the clarity and intelligibility of telephone speech for people with hearing losses.

BACKGROUND OF THE INVENTION

When using a telephone, hearing-impaired people need to have the volume of sound as well as the corresponding frequencies customized to their individual hearing loss in order to provide maximum intelligibility of incoming speech. One way of customizing the sound for a particular hearing-impaired person is to "pre-subscribe" a selected frequency enhancement for a household. In this manner, anytime a telephone extension within the household is used to place or receive a telephone call, the preselected frequency enhancement will be in effect. The hearing impaired person can then receive the benefits of selective frequency enhancement and better intelligibility.

While presubscription to a selected frequency enhancement or "sound flavor" improves intelligibility for the hearing-impaired person, this method of selecting a sound flavor may inconvenience and annoy other members of the household. For example, if the household is occupied by a person with severe hearing impairment to high frequencies, the telephone system can be configured to enhance greatly the high frequency sound components for all telephone calls to the household. However, the other members of the household will then be forced to hear these enhanced high frequency components on each and every call. In another example, a given household may be occupied by two hearing-impaired persons, each of whom requires a different or perhaps opposite frequency enhancement. In this case, presubscription to a particular sound flavor may be entirely inadequate for one of the parties.

SUMMARY OF THE INVENTION

Improved sound quality is provided in accordance with the principles of the invention by automatically selecting, or enabling the selection of, an appropriate sound enhancement for a particular individual at a given telephone number. Sound enhancements applied to calls originating from or terminating at a given telephone station are determined on a call-by-call basis. Thus, different occupants of a household may select their own sound enhancement, or may select no enhancement at all.

In an exemplary embodiment of the invention, the sound enhancement to be applied at a telephone station for a given telephone call is determined by (1) querying a database to determine what information must be collected to determine the identity of a person at the telephone station, (2) determining automatically, on the basis of the person's identity, which sound enhancement is to be applied to the call, and (3) applying the sound enhancement. The initial query to the database is triggered, for example, using advanced intelligent network techniques.

BRIEF DESCRIPTION OF THE DRAWING

In the drawing:

FIG. 1 is a simplified block diagram of a network, including intelligent network components, suitable for use with the present invention.

DETAILED DESCRIPTION

In accordance with the invention different sound enhancements (or no enhancement at all) is applied on a call-by-call basis. A person placing or receiving a call at a telephone station with a given telephone number or automatic number identifier (ANI) manually selects the sound enhancement to be applied for a given call. Alternatively, the communications network determines the identity of the person placing or receiving the call, and automatically applies a prespecified sound enhancement for the identified person. The sound enhancement is achieved by modifying in the telephone network audio signals transmitted to a subscriber so as to increase the amplitude of the signals (i.e., volume of sound) for selected ranges of frequencies. Techniques and apparatus for modifying the characteristics of the sound provided to a telephone subscriber at a telephone station using telecommunications network facilities are disclosed in U.S. Pat. No. 5,195, 132, issued Mar. 16, 1993, and entitled "Telephone Network Speech Signal Enhancement." which is hereby incorporated by reference. As discussed above, this capability can be used to improve the quality and intelligibility of telephone speech for people with hearing losses. The type and amount of enhancement to the sound can be tailored to people with slight, mild, moderate, and severe degrees of hearing loss, and to people with hearing impairment specific to certain frequency ranges. This enables different people within a given household or other location to select different "sound flavors" or frequency enhancements. Of course, one skilled in the art will appreciate that the invention can be used to provided personalized telephone service, and thus is not limited in scope to providing service to telephone subscriber with hearing impairments.

In the description that follows, it is to be understood that the term "subscriber" is used to refer to any person using a telephone station identified by a particular ANI, regardless of whether that person is the actual that has contracted with a communications company for telephone service. For example a subscriber could include all members of a household, as well as persons visiting a household that might use the household telephone to place or answer calls.

In an exemplary embodiment of the invention, the ANI of a household or other location is identified or pre-subscribed as one as having the sound enhancement service of the present invention. A default sound quality or enhancement also is selected for the ANI. This default service could be, for example, a "mild" enhancement in which certain high frequency sound components are slightly enhanced, or it could be that no enhancement is applied.

Consider for the moment the case in which the default sound quality is that no enhancement is applied. In this instance, a sound enhancement can be applied on a call-by-call basis by enabling the subscriber to select an enhancement by keying in a predetermined sequence of dual tone multi-frequency (DTMF) digits on the telephone keypad. Alternatively, the network can determine automatically, on the basis of the subscriber's identity, whether a different sound enhancement should be applied for the call.

At a high level, call processing according to the invention in which the sound enhancement is selected by the network involves four different steps: (1) detecting that special processing is required to process the call, (2) collecting information for determining the sound enhancement to be applied or determining the identity of the subscriber, (3) processing the collected information according to the service subscription for the ANI, and (4) executing call processing instructions to apply the appropriate sound enhancement (or use the default sound quality) for the call. Several illustrative implementations are described below for these steps, but one skilled in the art will appreciate that other variations and different combinations of these implementations could be used without departing from the principles of the invention.

In the detecting step (step 1), the network recognizes the ANI as one which is presubscribed for enhanced sound service. For outgoing calls, that is, calls placed from the household, this can be accomplished using advanced intelligent network techniques in which lifting the telephone hand set off-hook acts as a trigger to cause a database to be queried for instructions. For incoming calls (calls placed to the ANI), a dialed number look up is performed on the ANI to determine from a database how to process the call. In either case, the database causes the network to obtain information from the subscriber. Each of these alternatives are described in greater detail below.

In the information collection step, the network collects information about the subscriber's preference for sound enhancements or collects information about the subscriber's identity. When collecting information, the network may request the caller to specify a selection for sound enhancement by entering DTMF digits. Alternatively, the network collects information about the subscriber's identity, for example, by collecting a speech sample and use well-known voice recognition techniques to determine the identity of the caller. The subscriber's identity could be determined by requesting the subscriber to enter a personal identifier, select an option from a menu, or speak an instruction, such as the subscriber's name which is recognized using well known speech recognition techniques. (Speech recognition is different from voice recognition in that it refers to the capability of recognizing a given word or sequence of words, regardless of who actually speaks the word.)

Voice recognition techniques are particularly useful for identifying the subscriber's identity because the identification can be made without the subscriber even knowing that the identification is being made. For example, for outgoing calls, a default sound treatment can be applied for all calls. Upon going off-hook, a query to a database is made, indicating that a voice sample must be collected. When the subscriber begins to speak with the called party, the network collects the voice sample, without ever interfering with the call or disturbing the subscriber. After the network ascertains the subscriber's identity, it either applies the appropriate sound enhancement automatically or continues using the default sound treatment.

Having collected information about the subscriber's sound preference or identity, the network processes the information (step 3) to determine the sound treatment to apply for the call. The network simply applies the appropriate sound treatment (step 4), for example, by amplifying selected frequencies. Where the subscriber is prompted for or otherwise specifies the sound treatment directly, the processing is simple. However, where the network has collected information about the subscriber's identity, the network must determine the appropriate sound enhancement, if any, to be applied for the subscriber according to the subscriber's pre-specified (pre-subscribed) instructions stored in the database. The network then applies the appropriate sound treatment (step 4).

Before describing a specific exemplary network architecture for implementing the invention, it will be useful to describe in a general manner the key intelligent network elements which can be used to implement the invention. Intelligent network systems suitable for implementing the invention, in view of this disclosure, are well-known in the art and are commercially available from AT&T Corp. ("AT&T") under the A-I-Net™ advanced intelligent network family of products.

The intelligent network architecture superimposes on an existing telecommunications system a modular configuration of network elements which provide enhanced telecommunications services. Switching functions are performed by the base network in a conventional manner. The intelligent network includes a service switching point (SSP), a service control point (SCP), and a service management system (SMS). The intelligent network also may include an intelligent processor. One skilled in the art will appreciate that the intelligent network elements could be owned or controlled either by a local exchange carrier (LEG) or an interexchange carrier (IXC), or by both.

The SSP is a switch that operates to recognize service requests, requests call handling instructions from an SCP, and executes those instructions to complete a telephone call. The SSP provides intelligent network "triggering"—detecting a condition which requires the SSP to initiate the intelligent network service by sending a query to the SCP—used by the network to recognize requests. As described below, the intelligent call waiting service of the invention has its own "trigger profile," or set of data, that assigns the service a unique point of entry into intelligent network functions. The SSP also formulates and transmits requests to the SCP and processes replies and requests from the SCP. The SSP creates and plays intelligent network announcements formulated by the service provider (e.g., the local exchange or inter-exchange carrier), and transmits event messages (such as busy or no reply signals) to the SCP. The SSP illustratively is an AT&T 5ESS® switch provisioned with AT&T's A-I-Net™ intelligent software to provide SSP functionality.

The SCP is an intelligent network element which stores call control and call routing instructions executed by an SSP. The SCP receives requests from the SSP and determines the destination telephone number. The SCP receives and processes event messages from the SSP, and formulates and sends responses to the SSP. The SCP processes accounting and statistical information, such as the number of the calling party, the dialed intelligent network number, duration or type of ringing tone or call waiting signal, and other such call parameters. The SCP interfaces with and receives commands for controlling services and service features from the SMS. The SCP illustratively is AT&T's A-I-Net™ SCP.

The SMS is a management and provisioning system that serves as an intelligent network service administration platform. The SMS formulates and sends commands to the SCP to control services and service features. The SMS illustratively is an AT&T A-I-Net™ service management system.

The intelligent processor provides specialized functionality, such as speech recognition (identifying spoken words) and voice recognition (recognizing the voice of a particular speaker) capability. The intelligent processor also may perform the functions of a video signal generator or video signal database for applications such as providing images for call waiting signals for video telephone calls. The functionality of the intelligent processor may be implemented in a separate network element, or may be implemented through a multimedia SCP. Service provided by the intelligent processor may include, for example, voice digit dialing, name dialing, and voice recognition for authenticating the identity of an individual. Intelligent processor equipment suitable for use with the invention are well known in the art of intelligent network systems.

One area of intelligent call processing that merits special attention is the concept of "triggering." Triggering is the process by which a switch (e.g., an SSP) determines that a query message requesting call processing instructions will be sent to an SCP. A trigger is an occurrence of an event and the satisfaction of certain conditions which results in a message to the SCP. Triggers can be originating triggers, mid-call triggers, or terminating triggers. Examples of originating triggers are off-hook immediate and off-hook delay triggers, and custom dialing plan triggers. An example of a mid-call trigger is the busy condition. An example of a terminating trigger is the ring-no answer condition. Some of the more useful triggers for implementing the present invention are the off-hook trigger, which launches a query to a database as soon as the telephone receiver goes off-hook, and the dialing plan trigger, which triggers a query under specified conditions for a particular ANI.

Having described in a general manner the function of the principal intelligent network elements, a specific exemplary network architecture suitable for implementing the sound enhancement selection in accordance with the invention will now be described with reference to FIG. 1. Although the selection process will be described in the context of an incoming call, one skilled in the art will appreciate that sound enhancement selection for incoming calls also could be handled using similar advanced intelligent network processing, using an appropriate terminating or dialing plan trigger.

Assume for purposes of illustration that a subscriber at telephone station 10 wishes to place a call to a party at a telephone station 12. The call between telephone stations 10 and 12 extends from telephone station 12 to a local exchange carrier (LEC) switch 14, and is routed via interexchange carrier (IXC) switches 16 and 18 to LEC switch 20. LEC switch 14 is provisioned to provide the SSP functionality described above. When the subscriber initiates a call from telephone station 10 through LEC switch 14, the switch produces an originating trigger, for example, on the off-hook condition. That is, the off-hook condition at telephone station 10 triggers switch 14 to query an SCP 22 for call processing instructions. SCP 22 receives the inquiry from switch 14 and, using the ANI of telephone station 10, accesses a database for call processing instructions in accordance with the sound enhancement service prearranged or subscribed to for telephone station 10.

SCP 22 then instructs switch 14, by appropriate messaging well known to those skilled in the art, to collect information from the subscriber at telephone station 14. In those instances in which the subscriber consciously selects a sound enhancement or provides identifying information, SCP 22 notifies switch 14 to play appropriate announcements to the subscriber and to expect additional inputs (e.g., digits or voice commands) from the subscriber. Switch 14 plays an announcement to the subscriber requesting the subscriber to enter digits or voice commands, and collects the requested information from the subscriber. In those instances where the subscriber's identity is determined passively and without the subscriber knowing, such as where voice recognition techniques are used, switch 14 does not play announcements but simply collects information. Switch 14 then forwards the information to SCP 22, which determines the appropriate call processing on the basis of the subscriber-provided information. SCP 22 is provisioned to provide call processing instructions via an SMS (not shown). Switch 14 then executes the instructions—and applies the appropriate sound enhancement—as specified by SCP 22. Of course, one skilled in the art will appreciate that switch 14 performs other functions, such as processing billing records for the call, which are beyond the scope of this invention and need not be described.

Switch 14 may utilize an intelligent processor 24 to perform one or more specialized functions for interfacing with the subscriber at telephone station 14. For example, if SCP 22 instructs switch 14 to collect a voice print of the subscriber that will be used to determine the subscriber's identity, switch 14 will, in some instances, use intelligent processor 24 to collect and analyze the subscriber's voice print. Intelligent processor 24 would then return to switch 14 an indication of the subscriber's identity on the basis of the voice print, and switch 14 would provide this information to SCP 22 for further instructions on call processing.

Selection of a sound enhancement can be facilitated in accordance with the principles of the invention by using a dialed number table look-up. In this embodiment, when a call is placed to telephone station 10 of FIG. 1, a switch, such as switch 14 performs a look-up on the dialed number (i.e., on the ANI of telephone station 10) to determine whether special processing is required for handling the call. If special processing is required, namely, processing to select an appropriate sound enhancement for the call, the call is routed through a special platform or processor which performs the sound enhancement selection processing as described above. The processing could be performed using the advanced intelligent network architecture described above, or other convenient equipment well known in the telecommunications network art. A default sound enhancement (which could be no enhancement) is applied to the call until the required information, e.g., a voice sample, can be collected.

The principles of the invention have now been described in the context of (1) allowing the subscriber to directly select the sound enhancement, for example, by entering DTMF digits, and (2) having the communications network automatically select the sound enhancement on the basis of the subscriber's identity. These features can be extended, in accordance with the invention to permit changing the sound enhancement mid-call. This is useful, for example if the person at telephone station 10 (FIG. 1 ) changes mid-call. Regardless of the technique used to select the initial sound enhancement (e.g., item 1 or 2 above) the sound enhancement can be changed in the middle of a call, either by direct instructions from the subscriber or automatically upon detecting a different speaker using voice recognition techniques. Both methods would require some form of continual monitoring by the communications network, either in the form of a DTMF detector which "listens" for DTMF digits from the subscriber, or in the form of voice sampling hardware. Of course, a voice sample could be taken to automatically adjust the sound enhancement on receipt of a predetermined sequence of DTMF digits.

A default sound enhancement for a household and the sound enhancement to be applied for a particular subscriber can be selected in any convenient manner. One suitable method is to have the subscriber call a test platform, listen to various sound enhancements, and specify the subscriber's preferred enhancement. The preferences for individual subscribers, a household default sound enhancement, and sound enhancements to be used when the network cannot identify the person on the telephone, are associated with the ANI and stored in a database. The database then has an indication of the correct sound enhancement to be used under various circumstances for calls placed to or from the specified ANI. Similarly, the subscriber can call a suitable test platform to train the network, using well known techniques, to recognize the subscriber's voice.

The sound enhancement selection methods described above are equally applicable to calls placed using telephone "calling cards." In this instance, the subscriber's calling card number is used to look up a default sound enhancement and to activate the sound enhancement selection features described above (e.g., enable voice recognition or DTMF selection of a sound enhancement).

Sound enhancements could readily be performed at a central location in the communications network which is involved in establishing a telephone connection between two telephone station sets, and which may be readily adapted to enhance the quality of speech signals. The network is arranged to compensate the level of speech signals that it receives from a transmitting telephone station set, such as telephone station set 12. In particular, the compensation is designed to increase, or boost, the level of speech signals at a predetermined range (or ranges) frequencies. The amount of compensation, and the predetermined range of frequencies, correspond to the frequency enhancement that is selected by a subscriber in accordance with the principles of the invention. This enhancement may be achieved by passing speech signals received from a transmitting telephone station set through particular circuitry, such as for example, a digital filter. The coefficients of the digital filter are selected in a conventional manner to increase the level of speech signals occurring within a particular range of frequencies. In an illustrative embodiment of the invention, the digital filter may be arranged to increase the gain of speech signals occurring within the specified range of frequencies by, for example, 10–15 decibels (dB) relative to the gain provided at other non-selected frequencies. A suitable digital filter could be implemented using the DEQ7 digital equalizer which is commercially available from the Yamaha Corporation. Signal compensation could be performed in any suitable component of a telecommunications switch or in an adjunct to a telecommunications switch.

One skilled in the art will appreciate that various modifications can be made to the network and the sound enhancement selection process without departing from the scope of the invention. For example, the calls between telephone stations 10 and 12 could be routed through other network elements, such as additional IXC switches. Also, the sound enhancement selection service of the invention could be provided to calls to or from a mobile telephone, such as a cellular phone, or cable television facilities. For example, a call placed from mobile telephone 28 (see FIG. 1 ) via a commercially available mobile telephone switch 30 could be routed through switch 14 for processing as described above. Where the telephone is an integrated services digital network (ISDN) telephone, out of band signaling can be used to select a desired sound enhancement. This could be accomplished, for example, using a separate signaling channel, such as the D channel, to signal the network as to the desired sound enhancement.

We claim:

1. A method for use in a telecommunications system comprising the steps of:

accessing a database, in response to a predetermined trigger, to determine what information is to be collected from a subscriber at one of the first and second telephone station sets;

collecting the information from the subscriber; and responding to receipt of the collected information to increase the amplitude of audio signals transmitted to the subscriber in predetermined frequencies of those audio signals.

2. The method of claim 1 wherein the information comprises information about the identity of the subscriber.

3. The method of claim 2 wherein the step of increasing the amplitude of audio signals comprises automatically selecting the predetermined frequencies to be increased in amplitude exclusively as a function of the identity of the subscriber.

4. The method of claim 1 wherein the information comprises a sample of the subscriber's voice.

5. The method of claim 1 wherein the information comprises information indicative of a selection by the subscriber of frequencies to be enhanced.

6. A method of processing a call between telephone station sets, comprising the steps of:

(a) receiving a number associated with a telephone station set;

(b) receiving a voice sample spoken by a party at said telephone station set;

(c) with use of said voice sample, performing speaker recognition in an attempt to recognize the party as a particular person from a set of one or more predetermined persons associated with said received number; and (d) if the party is recognized as a particular one of said predetermined persons, applying a predetermined sound treatment, corresponding to said recognized person, to an audio signal communicated to the party during the call.

7. The method of claim 6 further comprising the step of, if the party is not recognized as a particular one of said predetermined persons, applying a default sound treatment to the audio signal communicated to the party.

8. The method of claim 7 wherein the predetermined sound treatment comprises a set of audio frequencies for enhancement.

9. The method of claim 6 wherein steps (b) and (c) are performed a plurality of times during a call.

10. A method of processing a call between telephone station sets, comprising the steps of:

(a) receiving a number associated with an account of a party against which account calls may be charged;

(b) receiving a voice sample spoken by the party at a telephone station set;

(c) with use of said voice sample, performing speaker recognition in an attempt to recognize the party as a particular person from a set of one or more predetermined persons associated with said received number; and (d) if the party is recognized as a particular one of said predetermined persons, applying a predetermined sound treatment, corresponding to said recognized person, to an audio signal communicated to the party during the call.

11. The method of claim 10 further comprising the step of, if the party is not recognized as a particular one of said predetermined persons, applying a default sound treatment to the audio signal communicated to the party.

12. The method of claim 10 wherein the predetermined sound treatment comprises set of audio frequencies for enhancement.

13. The method of claim 10 wherein steps (b) and (c) are performed a plurality of times during a call.

14. A method of processing a call between telephone station sets, comprising the steps of:
   (a) receiving a voice sample spoken by a first party at a telephone station set, said voice sample characterized in that it comprises a portion of a conversation with a second party;
   (b) with use of said voice sample, performing speaker recognition in an attempt to recognize the first party; and
   (c) if the first party is recognized, applying a predetermined sound treatment, corresponding to said recognized party, to an audio signal communicated to the first party during the call.

15. The method of claim 14 further comprising the step of, if the first party is not recognized as a particular one of said predetermined persons, applying a default sound treatment to the audio signal communicated to the first party.

16. The method of claim 14 wherein the predetermined sound treatment comprises a set of audio frequencies for enhancement.

17. The method of claim 14 wherein steps (a) and (b) are performed a plurality of times during a call.

* * * * *